US011544151B2

(12) United States Patent
Hetrick et al.

(10) Patent No.: US 11,544,151 B2
(45) Date of Patent: Jan. 3, 2023

(54) DATA BACKUP TECHNIQUE FOR BACKING UP DATA TO AN OBJECT STORAGE SERVICE

(71) Applicant: NETAPP, INC., San Jose, CA (US)

(72) Inventors: William Hetrick, Eastborough, KS (US); Dennis James Hahn, Wichita, KS (US); Russell Winkler, Sunnyvale, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/408,018

(22) Filed: Aug. 20, 2021

(65) Prior Publication Data

US 2021/0382791 A1 Dec. 9, 2021

Related U.S. Application Data

(63) Continuation of application No. 14/521,053, filed on Oct. 22, 2014, now abandoned.

(51) Int. Cl.
*G06F 11/14* (2006.01)
*G06F 11/00* (2006.01)

(52) U.S. Cl.
CPC ...... *G06F 11/1451* (2013.01); *G06F 11/1448* (2013.01); *G06F 11/006* (2013.01); *G06F 2201/835* (2013.01)

(58) Field of Classification Search
CPC ............. G06F 11/1451; G06F 11/1448; G06F 11/006; G06F 2201/835
See application file for complete search history.

(56) References Cited

U.S. PATENT DOCUMENTS

| | | | |
|---|---|---|---|
| 8,386,733 B1 | 2/2013 | Tsaur et al. | |
| 8,990,162 B1 | 3/2015 | Kushwah et al. | |
| 2006/0010174 A1 | 1/2006 | Nguyen et al. | |
| 2006/0259516 A1 | 11/2006 | Stakutis et al. | |
| 2008/0313291 A1 | 12/2008 | Kazmi | |
| 2010/0318782 A1* | 12/2010 | Auradkar | G06F 11/1464 726/4 |
| 2011/0218966 A1 | 9/2011 | Barnes et al. | |
| 2012/0016841 A1 | 1/2012 | Karonde et al. | |
| 2012/0066469 A1* | 3/2012 | Yochai | G06F 11/1448 711/170 |
| 2015/0112939 A1 | 4/2015 | Cantwell et al. | |
| 2018/0124157 A1* | 5/2018 | Gao | G06F 3/0665 |

\* cited by examiner

*Primary Examiner* — Masud K Khan
(74) *Attorney, Agent, or Firm* — Loza & Loza, LLP; Tejinder Singh

(57) ABSTRACT

A system, method, and computer program product for a block-based backing up a storage device to an object storage service is provided. This includes the generation of a data object that encapsulates a data of a data extent. The data extent covers a block address range of the storage device. The data object is named with a base name that represents a logical block address (LBA) of the data extent. The base name is appended with an identifier that deterministically identifies a recovery point that the data object is associated with. The base name combined with the identifier represents a data object name for the data object. The named data object is then transmitted to the object storage service for backup of the data extent. At an initial backup, the full storage device is copied. In incremental backups afterwards, only those data extents that changed are backed up.

20 Claims, 7 Drawing Sheets

DATA BACKUP TECHNIQUE FOR BACKING UP DATA TO AN OBJECT STORAGE SERVICE

CROSS-REFERENCE TO RELATED APPLICATIONS

This application is related to U.S. application Ser. No. 14/521,130, filed on Oct. 22, 2014, by William Hetrick, et al., entitled "DATA RECOVERY TECHNIQUE FOR RECOVERING DATA FROM AN OBJECT STORE", which is incorporated herein by reference in its entirety. This application claims priority of and is a continuation of U.S. patent application Ser. No. 14/521,053, filed on Oct. 22, 2014, entitled "DATA RECOVERY TECHNIQUE FOR RECOVERING DATA FROM AN OBJECT STORE," the disclosure of which is incorporated herein by reference in its entirety.

TECHNICAL FIELD

The present description relates to data backup and, more specifically, to systems, methods, and machine-readable media for a block-level backup of data to an object storage service.

BACKGROUND

A storage device is an entity, such as a hard drive, directly connected to a computer or a volume provisioned from a storage system and mapped to a computer. Storage devices may be accessed using a block storage protocol, such as SCSI or SATA, where commands identify data using an address representing a physical or virtual location on the storage device. A typical block-level command includes an operation code (e.g. READ or WRITE), an address, and a length argument.

When storing data, one or more backup copies are highly recommended. By keeping an independent copy of the data stored on the storage device, in the event of device failure, unavailability, or user error, the underlying data stored on the device can still be retrieved. Often, the backup data is stored in a different physical location than the block storage device so that if the physical location of the block storage device is compromised, the backup data can still be retrieved and restored Maintaining a backup repository service at a second physical site can be prohibitively expensive, however.

Cloud services have become prevalent in recent years as a readily available and affordable data storage service. A typical service offered by a cloud storage provider is an object storage service. Object storage services generally charge a small transaction fee to write and read data as well as a fee for the amount of data stored. Object storage services typically utilize multiple replicas to guard against data loss to increase reliability. Object storage services are accessed through Internet Protocol methods, such as embedding requests in an HTTP request. The HTTP request is sent to a host server of the object storage along with the request action (e.g. PUT or GET) and the payload of the request. Objects are written to the object store similar to a file system in that when an object is written to the object storage service, the object is an accessible entity. The whole object is written as part of a single command, and retrieved as a single command.

Because of the differences between object-level and block-level protocols, object storage services do not offer block-based backup services. Accordingly, while conventional data backup techniques have been generally adequate, backup techniques that bridge the incompatibilities between block-based devices and object storage systems may present new possibilities. They may leverage the low-cost, large capacities, and world-wide availability of object storage services for data preservation and restoration. Using an object storage service for a backup application would free the consumer from investing in the equipment and physical location of a remote site. Accordingly, despite the widespread use of conventional data backup techniques, the potential remains for further improvements.

BRIEF DESCRIPTION OF THE DRAWINGS

The present disclosure is best understood from the following detailed description when read with the accompanying figures.

DETAILED DESCRIPTION

Figure 1A:
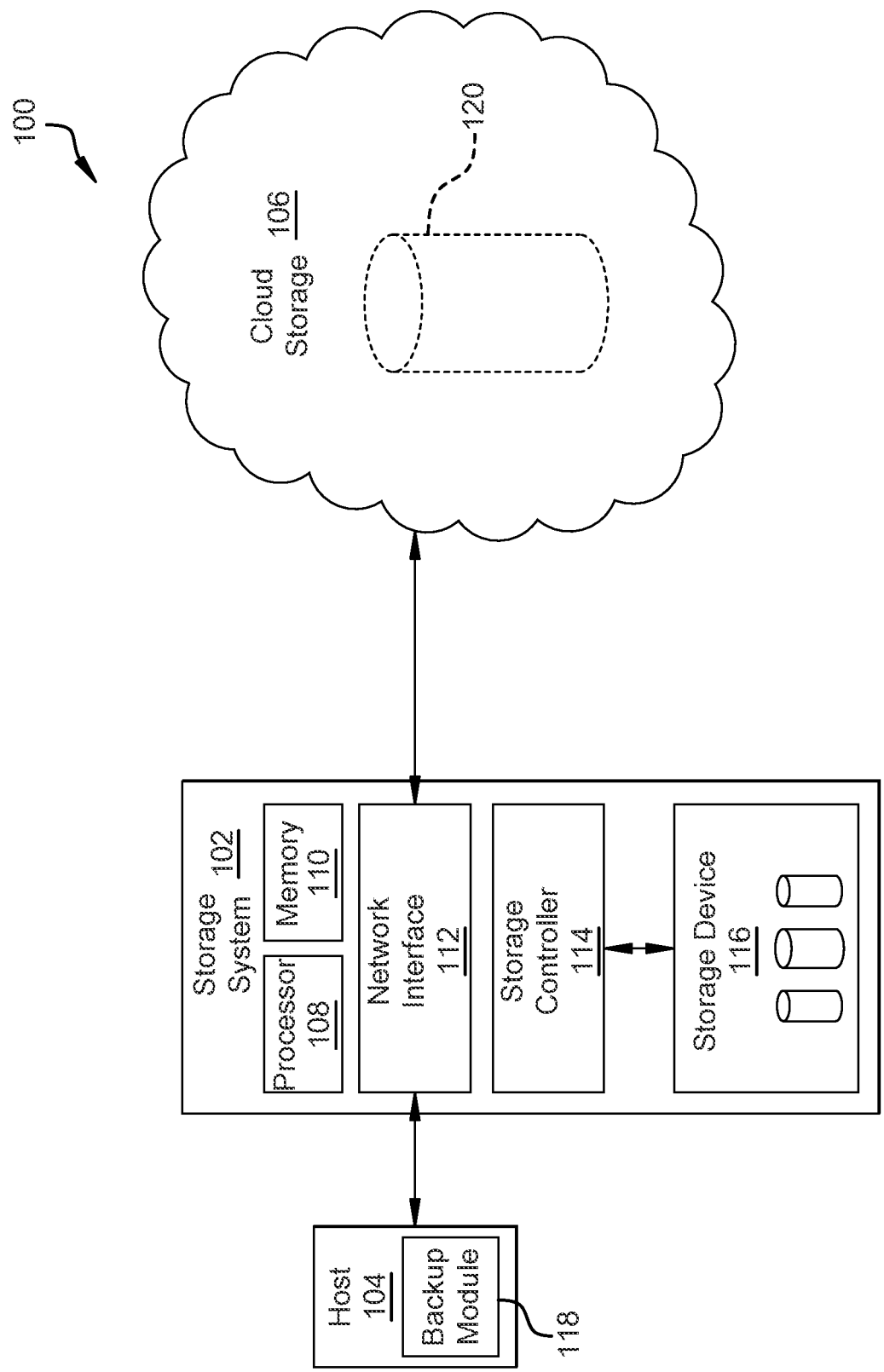
FIGS. 1A and 1B are organizational diagrams of data storage architectures according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for block-based backing up of a storage device and for storing the data in an object storage service. The techniques herein bridge the otherwise incompatible protocols used in block storage devices and object storage devices to encapsulate data blocks in data objects in a manner that allows for fast and efficient data recovery. In an example, a backup service converts data on a device to be backed up into a set of data objects and transmits the data object block to an object storage service over a network such as the Internet.

In the example, the backup service divides the block storage device into multiple data extents (address ranges) that are sized to facilitate efficient and cost-effective transmission over a network of the data to the object storage service. The backup service then may compress and encrypt the data stored within each data extent to increase transmissibility and security of the data. The backup service converts each data extent to a corresponding data object. Each data object is assigned a name that includes a starting logical base address of its corresponding data extent. Appended to this name may be a prefix that uniquely identifies the volume where the corresponding data extent is located (where there are multiple volumes on the block storage device). A recovery point identifier is also appended (such as in the form of a suffix to the base name), e.g., a timestamp, that can be used to deterministically distinguish what point in time the copy of the data corresponds to.

Once named, the data objects are transmitted to the object storage service for storing. Concurrently, a configuration metadata object may be generated that contains a description of the storage device being backed up. A recovery point metadata object may also be generated that lists the data objects corresponding to the current recovery point.

For a comprehensive backup, data objects may be created, named, and transmitted for each of the data extents in the address space (the entire range of addresses) of the volume (or volumes where applicable) across the storage device. The backup service may also perform an incremental backup. In some such examples the backup service tracks the data extents to identify those that change in some way over a set period of time. After the set period of time, the backup service may implement an incremental backup where only those data extents that have changed are backed up. When the changed data extents are backed up, they are again converted to data objects. These changed data extents keep the same base name (using the starting Logical Block Address (LBA) of each data extent) but have an updated suffix corresponding to the new recovery point. A new recovery point metadata object may also be generated at this time that lists the data objects associated with the new recovery point, which may often include a mix of the recently changed data objects as well as "older" data objects that did not change in the time period.

Over time, many recovery points may accumulate. Embodiments of the present disclosure also include the pruning of outdated recovery points and associated outdated data objects to maintain a manageable and affordable amount of data at the object storage service. For example, the backup service may have a policy that defines how many recovery points should be supported for any given time. Any data objects with a suffix that identifies them with recovery points older than the supported amount are marked for deletion as part of the pruning. Before deleting any of these marked data objects, the backup service may check whether they are listed in the supported recovery points, indicating that they are still in use. Those data objects still listed with supported recovery points are removed from candidacy for deletion, while the backup service proceeds with causing the remaining marked data objects to be deleted.

Figure 1B:
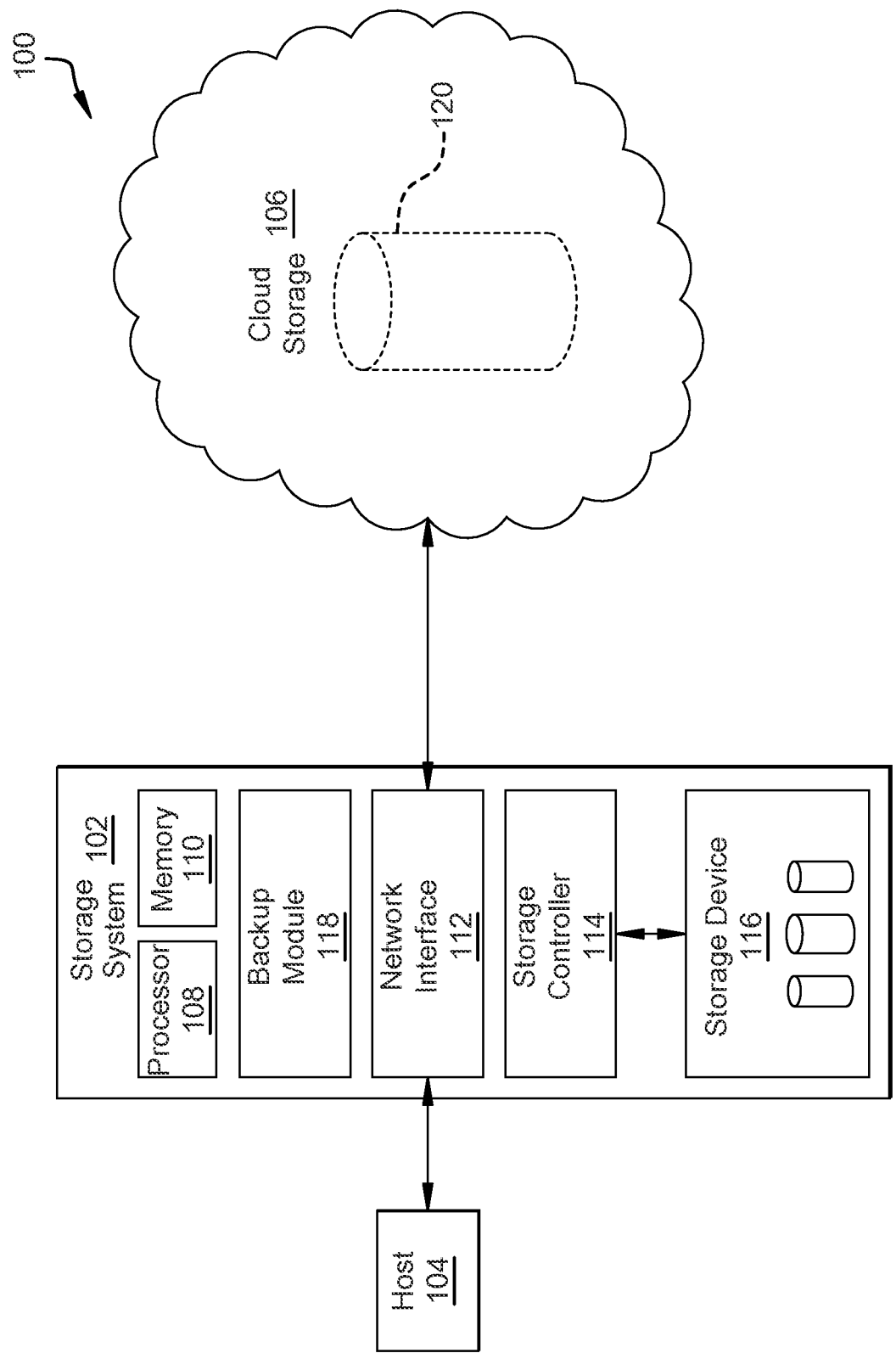

A data storage architecture is described with references to FIG. 1A and FIG. 1B. As discussed in more detail below, the data storage architecture may include a backup module, and FIGS. 1A and 1B show the backup module being incorporated into different computing systems. Referring first to FIG. 1A, illustrated is an organizational diagram of the data storage architecture 100 according to aspects of the present disclosure. The data storage architecture 100 includes a storage system 102 that processes data transactions on behalf of other computing systems including one or more hosts, exemplified by host 104, as well as a cloud storage service 106 that can provide remote backup services to the storage system 102. Although there could be a plurality of hosts, FIG. 1A is described with respect to one host 104 for simplicity of discussion, though it will be recognized that the same will apply when there are more hosts. The storage system 102 may receive data transactions (e.g., requests to read and/or write data) from the host 104, and take an action such as reading, writing, or otherwise accessing the requested data. For many exemplary transactions, the storage system 102 returns a response such as requested data and/or a status indictor to the host 104. The storage system 102 is merely one example of a computing system that may be used in conjunction with the systems and methods of the present disclosure.

The storage system 102 is a computing system and, in that regard, may include a processing resource 108 (e.g., a microprocessor, a microprocessor core, a microcontroller, an application-specific integrated circuit (ASIC), etc.), a transitory and/or non-transitory computer-readable storage medium 110 (e.g., a hard drive, flash memory, random access memory (RAM), optical storage such as a CD-ROM, DVD, or Blu-Ray device, etc.), and a network interface device 112 (e.g., an Ethernet controller, wireless communication controller, etc.) operable to communicate with the host 104 over a network or without using a network (e.g., directly connected) as well as with the cloud storage service 106 over the same or a different network.

The storage system 102 also includes one or more storage controllers 114 in communication with a storage device 116. The storage device 116 may be a block storage device and may include any number of suitable storage devices using any suitable storage medium including electromagnetic hard disk drives (HDDs), solid-state drives (SSDs), flash memory, RAM, optical media, and/or other suitable storage media. The storage device 116 may include devices of single type (e.g., HDDs) or may include a heterogeneous combination of media (e.g., HDDs with built-in RAM caches).

In an embodiment, the storage device 116 includes a plurality of HDDs arranged in a Redundant Array of Independent Disks (RAID) configuration. In another embodiment, the storage device 116 includes a plurality of solid state drives (SSDs) and/or random-access memory configured as a RAM disk. This is a common configuration for a storage system 102 in part because of the increased performance of SSDs with respect to HDDs. In a further embodiment, the storage device 116 includes a combination of RAID HDDs, RAM disk(s), and SSDs. As will be recognized, these configurations are merely exemplary and the storage device 116 may include any suitable storage device or devices in keeping with the scope and spirit of the present disclosure. The storage device 116 may be arranged into one or more logical volumes that may range from one or more volumes on a single physical device to ranging across multiple physical devices.

The storage system 102 receives memory transactions from the host 104 directed to the data of the storage device 116. During operation, the storage system 102 may also generate memory transactions independent of those received from the host 104. Memory transactions are requests to read, write, or otherwise access data stored within a computer memory such as the storage device 116, and are often categorized as either block-level or file-level. Block-level protocols designate data locations using an address within the storage device 116. Suitable addresses include physical addresses, which specify an exact location on a storage device, and virtual addresses, which remap the physical addresses so that a program can access an address space without concern for how it is distributed among underlying storage devices 116. Exemplary block-level protocols include iSCSI, Fibre Channel, and Fibre Channel over Ethernet (FCoE). iSCSI is particularly well suited for embodiments where data transactions are received over a network that includes the Internet, a Wide Area Network (WAN), and/or a Local Area Network (LAN). Fibre Channel and FCoE are well suited for embodiments where host 104 is coupled to the storage system 102 via a direct connection. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system 102 that responds to file-level transactions. It is understood that the scope of present disclosure is not limited to either block-level or file-level protocols, and in many embodiments, the storage system 102 is responsive to a number of different memory transaction protocols.

The cloud storage service 106 is a type of data storage that is provided on the cloud, e.g., an enterprise-class cloud storage array provided by a cloud storage provider with multiple copies of data distributed throughout the world, providing distributed resources that are fault tolerant and durable. In an embodiment, the cloud storage service 106 provisions resources on demand without regard for the underlying hardware wherever distributed throughout the world. Storage capacity with the cloud storage service 106 may be purchased or leased and may be provided by off-premises (e.g., physically remote) or on-premises services. The cloud storage service 106 may provide a hosted object storage service to subscribers, for example storage system 102 in FIG. 1A.

A backup module 118 provides a backup service to the storage system 102 that interfaces between the storage system 102 and the cloud storage service 106, thereby enabling the storage system 102 to back up data to the object storage service of the cloud storage service 106. The backup module 118 may be composed of hardware, software, or some combination of the two. In the embodiment illustrated in FIG. 1A, the backup module 118 is located with the host 104, remote from the storage system 102. In further embodiments, the backup module 118 is located within any other computing system including the storage system 102 in the embodiments of FIG. 1B.

The backup module 118 is used to divide the storage device(s) 116 of the storage system 102 and/or the hosts 104 into one or more data extents. A data extent is a contiguous area of storage in the block storage device, and may be independent of the logical-block size of the block storage device(s) and be of varying size, as will be discussed in more detail below with respect to subsequent figures. The backup module 118 then takes the data extents, converts them to data objects, uniquely names them, and includes metadata that, together, are used to assist in recovering the data in the data objects at a later time. For example, a suffix appended to the name assigned to each data object may be used to identify the recovery point associated with the given data object's underlying data extent.

The backup module 118 may perform this backup of the data in the storage system 102 and/or host 104 as a full backup, meaning that all the data stored is initially backed up at the cloud storage service 106. Over time, the backup module 118 may monitor the storage system 102 and incrementally back up the data at the storage device 102 and/or host 104 by initiating backup for only those data extents that have changed since a prior backup time (e.g., the initial backup). At these times, the backup module 118 also updates the names of the changed data extents' corresponding updated data objects to reflect a new recovery point for the changed data. At certain intervals, the backup module 118 may additionally prune the existing backed-up data objects at the cloud storage service 106 to remove older data objects (that correspond to data extents that have since been updated) that are outdated and no longer supported.

In an embodiment, the backup module 118 causes the above-noted operations to be performed at the storage system 102, including transmitting the data objects via the network interface 112 to the cloud storage service 106. Alternatively, the backup module 118 may perform the above-noted operations where it is located, in the host 104 in FIG. 1A, including transmitting the data objects to the cloud storage service 106 from the host 104 via the same or a different network as that used to communicate with the storage system 102.

Turning to FIG. 1B, an organizational diagram of the data storage architecture 100 is presented according to alternative aspects of the present disclosure. For simplicity of discussion, only those aspects in FIG. 1B that are different from FIG. 1A will be addressed. In FIG. 1B, the backup module is shown as integrated with the storage system 102, instead of being located with the host 104 as in FIG. 1A. As an additional alternative, the backup module 118 may be integrated with a separate computing system from either the host 104 or the storage system 102.

Figure 2:
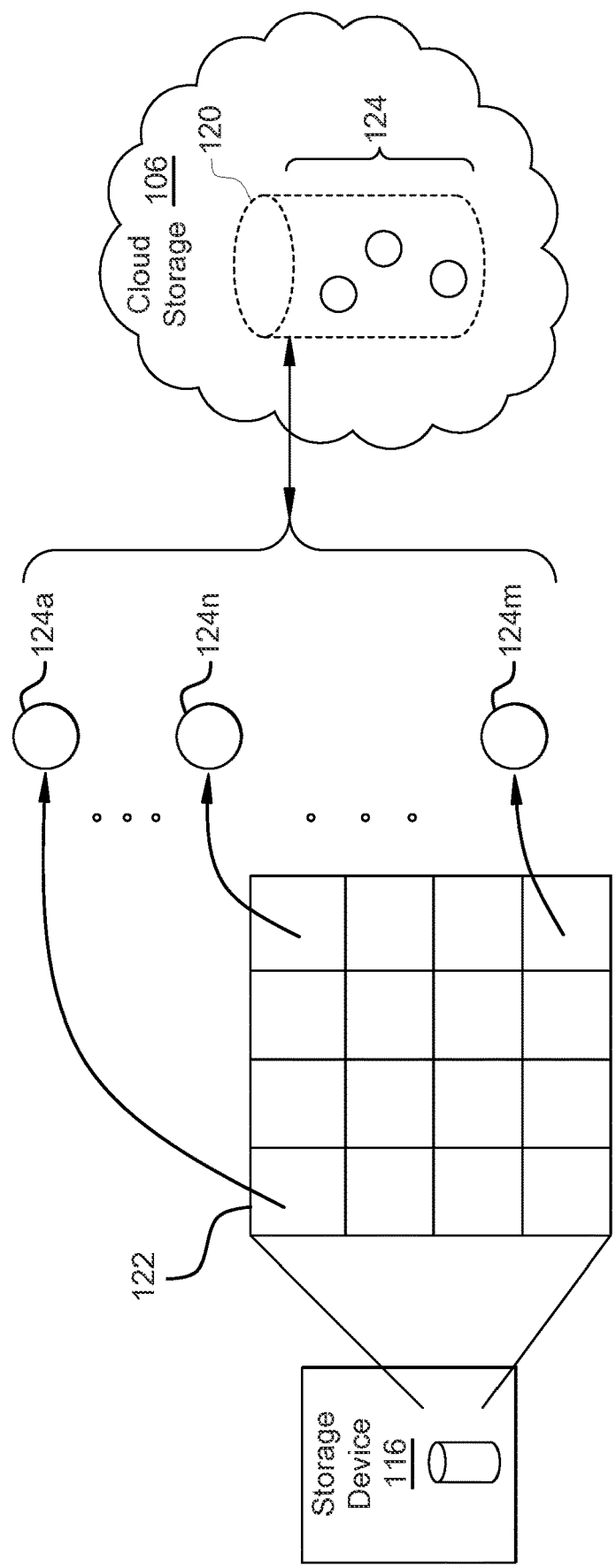
FIG. 2 is a diagram of a relationship between a block storage device's data and storage of that data in an object storage service according to aspects of the present disclosure.

FIG. 2 is a diagram of a relationship between a block storage device's data and storage of that data in an object storage service according to aspects of the present disclosure. In an embodiment, the block storage device of FIG. 2 represents the storage device 116 of FIGS. 1A and 1B, demonstrating an exemplary manner in which to convert the data stored with the storage device 116 to a format compatible for backup storage at the cloud storage service 106.

The backup module 118 may divide up the storage device 116 into a plurality of data extents, visualized in FIG. 2 as extent matrix 122. As can be seen, the extent matrix 122 includes a plurality of data extents. In an embodiment, the backup module 118 may divide up the data storage device 116 so that the data extents are all the same size (e.g., number of bytes). Each data extent in the extent matrix 122 has a logical block address (LBA) that represents the starting LBA of the given data extent. The data extents are sized to obtain optimal performance when uploading the corresponding data objects to the cloud storage service 106 while still being sized appropriately to manage copying redundant data for subsequent uploads to the cloud storage service 106. Further, the data extents are sized small enough to assure that the corresponding data objects may upload with sufficient speed to the often remote cloud storage service 106. As just one example, the data extents may be sized between 512 KB to 5 MB, though other sizes smaller or larger are possible as well, depending upon the bandwidth available for transmitting data objects and the amount of memory usage available or desired at the controller controlling backing up, such as the backup module 118 located separately or integrated with the storage system 102.

The backup module 118 then converts the smaller data extents into corresponding data objects, illustrated by the exemplary data objects 124a-124m in FIG. 2. Although not shown in FIG. 2 for purposes of illustrative clarity, it will be appreciated that there would be a separate data object corresponding to each of the data extents defined by the backup module 118. For purposes of simplicity of discussion, the following will discuss what occurs with respect to data object 124*a* in particular, with the understanding that the same process applies to the other data objects.

In some embodiments, prior to conversion to the data object 124*a*, the data extent may have its data compressed and/or encrypted, for example by the AES-256 algorithm to name just one example. Other algorithms/hashes may be used in the alternative or in addition that can be decrypted back to the original data, as will be recognized. In further embodiments, such as where the compression and/or encryption algorithms do not include it already, the backup module 118 may also perform a checksum on the resulting data object 124*a*. Information regarding the compression and/or encryption algorithms used may be inserted as a metadata tag into the data object 124*a*. The checksum may also be included as a metadata tag in the data object 124*a*, either as a separate tag or together with the compression and/or encryption tag.

Once the data object 124*a* has been created to house the underlying raw data of the corresponding data extent, the backup module 118 names the data object 124*a*. In embodiments of the present disclosure, the data object 124*a* is named with a base name that represents the LBA of the corresponding data extent. For example, if the data object 124*a* corresponds to the first data extent of the storage device 116, which starts with an address of 00000, the base name of the data object 124*a* would be assigned to be 00000.

The backup module 118 then appends a recovery point identifier to the base name that represents the recovery point that the data object 124*a* is associated with. The recovery point identifier may be a value that can be sorted so that a later recovery point can be deterministically distinguished from an earlier recovery point. Thus, the value of the identifier could be any sortable value. One example would be a timestamp, which is the example that the following discussion will use as its basis, though other values are possible as well. In an exemplary embodiment, the recovery point identifier is appended to the base name as a suffix separated from the base name by a delimiter.

In embodiments where there are multiple volumes, either logical or otherwise, that need to be backed up in the storage device 116, a volume identifier may also be appended to the base name of the data object 124*a*, separated by another delimiter, either of the same kind or a different kind as the delimiter separating the base name from the suffix. In an embodiment, the volume identifier is a direct copy of the volume identifier used by the storage controller 114 to track volumes in the storage device 116. In embodiments where there is only one volume to be backed up, the volume identifier may still be included, using either the volume name or a default name. As just one simple example, the storage device 116 may be separated into two volumes A and B, where the data object 124*a* corresponds to the first data extent in volume A. The volume identifier may be appended as a prefix separated by a delimiter from the base name, i.e., "A/00000/t0".

In an alternative embodiment, the backup module 118 may divide up the storage device 116 into variable-sized data extents, such that two different data extents may have different sizes from each other. In this alternative, the backup module 118 may additionally insert a range size of the given data extent into the name, such as between the base name and the suffix. This may assist any system that may need to reconstruct the backed up data in the future.

After the data object 124*a* has been created and named, the data object 124*a* is transmitted to and stored with the cloud storage service 106. For example, in FIG. 1A the backup module 118 may instruct the storage system 102 to transmit the proper command (according to the protocol used by the cloud storage service 106), along with the data object 124*a*, to the cloud storage service 106. For example, where the cloud storage service 106 utilizes the representational state transfer (REST) protocol to embed a request into an HTTP request, the backup module 118 may cause the storage system 102 to embed a PUT request into an HTTP request, and cause the storage system 102 via the network interface 112 to transmit the HTTP request with the payload (the data object 124*a*). In the alternative embodiment of FIG. 1B, the storage system 102, via the backup module 118, embeds the request into the HTTP request and transmits the request together with the payload from the network interface 112 to the cloud storage service 106.

In addition to the data object 124*a*, the backup module 118 additionally generates a configuration metadata object that contains a description of the block device being backed up, for example one for each volume of the storage device 106 that is being backed up to the cloud storage service 106. The configuration metadata object may include such attributes as storage system name, volume name, capacity of the block device or volume, and block size of the block device, among other things. The configuration metadata object is also transmitted to the cloud storage service 106 for storage, for example via the network interface 112.

Once the cloud storage system 106 receives the data object 124*a* (again, exemplary of all of the data objects 124*a*-124*m*), the cloud storage system 106 stores the received data object 124*a* in container 120. In an embodiment, the cloud storage system 106 may maintain a separate container for each volume that is backed up from the storage system 102. Alternatively, the cloud storage system 106 may maintain more containers in a pre-configured hierarchy for backing up the storage system 102. The cloud storage service 106 also stores the configuration metadata object corresponding to the block device being backed up in the same container 120 where the underlying data is backed up. In this manner, all of the data objects 124*a*-124*m*, corresponding to the plurality of data extents in the extent matrix 122, may be backed up in the cloud storage system 106 in container 120 together with metadata that describes the block device that was backed up.

Although the discussion above has been with respect to the backup module 118 as a single operative entity, it will be understood that several of the different operations above may be performed by a different module in cooperation with the backup module 118, such as a compression module and an encryption module, to name just two examples. Any of the modules may be composed of hardware, software, or some combination of the two, integrated with, located with, or under control at a remote location by, the backup module 118.

Figure 3:
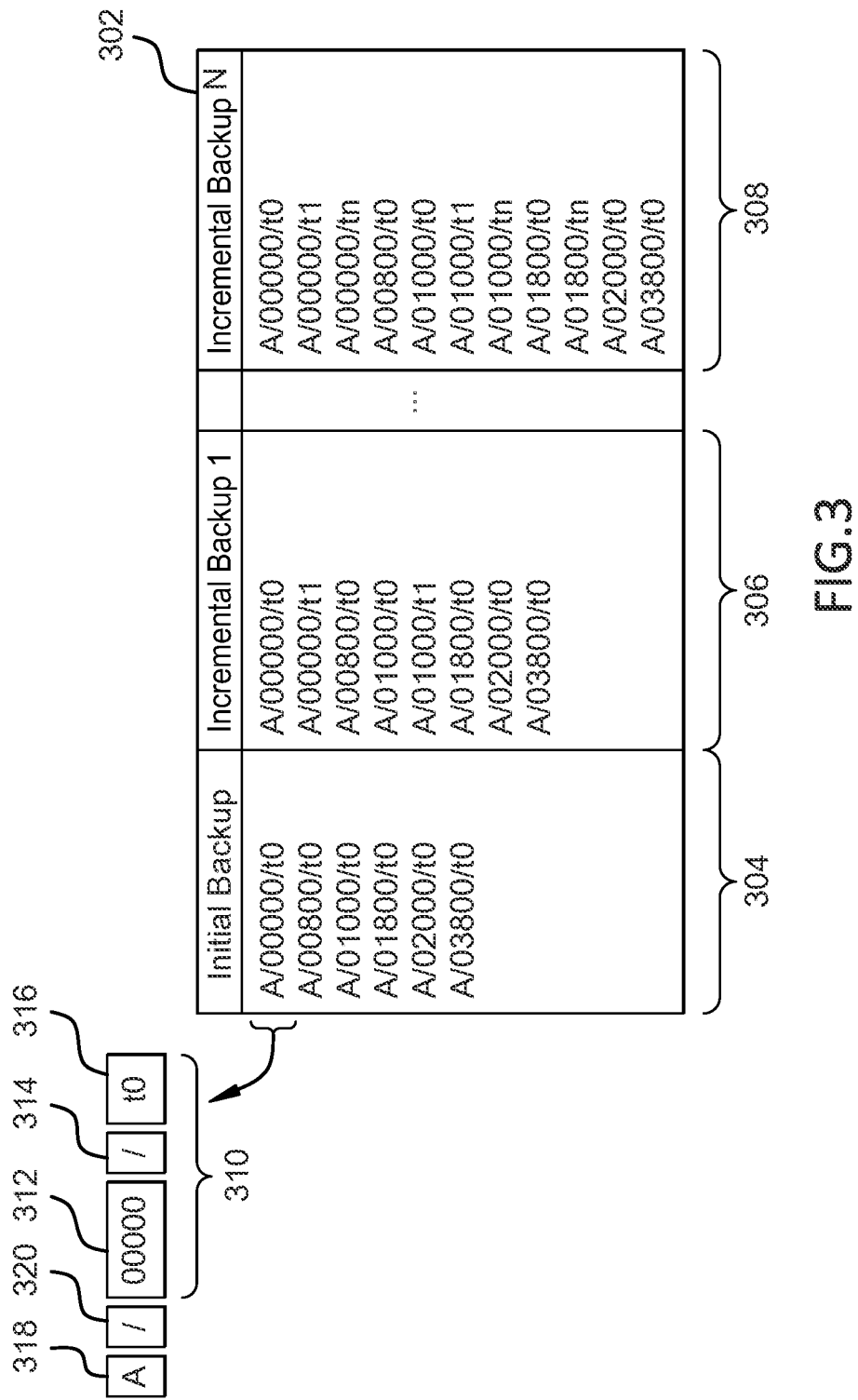
FIG. 3 is a diagram illustrating a relationship over time of data objects stored at different times with an object storage service according to aspects of the present disclosure.

FIG. 3 is a diagram illustrating a relationship over time of data objects, such as data objects 124*a*-124*m* of FIG. 2, stored at different times with object storage service 106 according to aspects of the present disclosure.

Table 302 in FIG. 3 illustrates the contents of a data store at different points in time. Illustrated in FIG. 3 are an initial time 304, a first time 306, and an $n^{th}$ time 308. At the initial time 304 when the data is backed up for storage system 102, the backup module 118 causes the storage system 102 to back up all of the data in the storage device 116. In embodiments where the storage device 116 is a thin provisioned volume, the initial backup at the initial time 304 limits backup to copying address ranges of the storage device 116 that have been provisioned, thereby reducing unnecessary resources and time.

As can be seen in the example of FIG. 3, at the initial time 304 a plurality of data objects have been stored that correspond to a plurality of data extents at the storage system 102. Each data object has a name, as illustrated by exemplary name 310. Exemplary name 310 includes base name 312, which corresponds to the LBA of the data extent that was copied for backup. Following the base name 312 is the delimiter 314, which is shown in FIG. 3 as a forward slash "I" by way of example only. The suffix 316 follows the delimiter 314 and is a value that can be sorted so that a later recovery point can be deterministically distinguished from an earlier recovery point, shown here as a time stamp t0. In embodiments where there are multiple volumes maintained by the storage system 102, the exemplary name 310 may also include a prefix 318 separated from the base name 312 by delimiter 320. The prefix 318 functions as a volume identifier to indicate which volume a given data object is copied from, which is useful in subsequent recovery efforts.

After the initial backup at initial time 304, subsequent backups at times 306 and 308 may be limited to incremental backups. In other words, the backup module 118 causes only data extents with changed data to be backed up again at the cloud storage service 106. The backup module 118 may track the data extents of the storage device 116 that have been changed since the most recent backup. In one embodiment, the backup module 118 may cause the storage system 102 to sweep the entire address space(s) that has been backed up to identify any changed data.

In an alternative embodiment, the backup module 118 may monitor commands sent to the storage device 116 over time that suggest that data has changed at the target of the commands. As just one example, the backup module 118 may track writes that have been sent to the storage device 116 and record the results in a write log. The write log may be a combination of two bitmaps. During a first time period the backup module 118 may record observances of write events in the first bitmap. When the time period ends and it is time for an incremental backup, the backup module 118 may freeze the first bitmap to facilitate the incremental backup. In conjunction with this, the backup module 118 may cause the storage system 102 to create a snapshot of the volume being backed up so that the data is frozen during backup, thereby avoiding any unknown states. For example, the storage controller 114 may have snapshot functionality built in to perform this action.

During this frozen period and during the new time period, the backup module 118 may track writes that have been sent to the storage device 116 in the second bitmap. In this manner, any changes that may occur to any data extents during the frozen period are captured and taken care of at a subsequent time. When the new time period closes, the second bitmap may be frozen to facilitate a new incremental backup, and the backup module 118 may again revert back to the first bitmap. In this manner, the bitmap used may repeatedly alternate so that tracking may occur uninterrupted even during times that incremental backup occurs. Though described with respect to writes, other actions may additionally or alternatively be monitored which are known to cause changes to data that would need to be captured by a backup event.

Focusing on first time 306 as an example, the backup module 118 follows a similar process as with initial backup for data extents that have changed and are in need of an incremental backup. With the data extents already defined, the backup module 118 proceeds with converting the changed data extents, where changes to the underlying data have occurred, into respective updated data objects (which may include compression, encryption, and/or checksum as well or for the first time). These updated data objects use the same naming convention as their data object predecessors, except that the suffix is changed to reflect that a new recovery point has been set for the updated data object.

Continuing with the example name above introduced with respect to FIG. 2, and assuming that the data extent starting LBA 00000 has changed in some way, the backup module 118 assigns the base name to again be 00000, but assigns a new suffix corresponding to the new time at first time 306, shown in FIG. 3 as t1. As a result, the updated data object is named, in this example, "A/00000/t1". As can be seen in FIG. 3, the only other data extent that changed was located at LBA 01000, causing the name to change to "A/01000/t1". Since the other data extents did not have any changes occur to their underlying data, no incremental backup occurs and so no new data objects with new suffixes are stored at the cloud storage service 106 for the unchanged data extents.

This can be again seen with respect to $n^{th}$ time 308, where it can be seen in the example of FIG. 3 that at time n the data extents located at LBAs 00000, 01000, and 01800 were the only ones to change. Thus, the backup module 118 proceeds with converting the data extents where changes to the underlying data have occurred into respective updated data objects (which may include compression, encryption, and/or checksum as well or for the first time). These updated data objects again use the same naming convention as their predecessors at initial time 304 and first time 306, except that the suffix is changed to reflect that a new recovery point has been set for the updated data object at time n. Looking to LBA 00000 as exemplary, the updated data object would be named, in this example, "A/00000/tn". Since the other data extents did not have any changes occur to their underlying data, no incremental backup occurs and so no new data objects with new suffixes are stored at the cloud storage service 106 for the unchanged data extents.

When each backup occurs, such as the initial time 304 or the incremental backup at first times 306 or 308 in FIG. 3, a (new) recovery point metadata object may be generated that defines the set of recovery points supported for the corresponding time period. For example, at the initial time 304 the corresponding recovery point metadata object lists, as data objects associated with the current recovery point for initial time 304, all of the data objects shown in the column for time 304. Further, at first time 306, a new recovery point metadata object is created that lists, for the recovery point for first time 306, all of the data objects listed with first time 306. This recovery point metadata object is updated at the completion of each backup. Data objects with a new suffix (e.g. timestamp) are written to the cloud storage service 106 for the backup, but that timestamp may not be considered a recovery point until the new recovery point metadata object has been finalized. This is repeated for each new time that corresponds to a new recovery point.

As can be seen, as time progresses, more and more recovery points accrue, with corresponding recovery point metadata objects and data objects 124, using up more and more storage space in the cloud storage service 106. In an embodiment, a policy decision may have been made to support only a limited number of past recovery points, for example a few to several dozen or more (e.g., 3 past recovery points or 30 past recovery points, just to name two examples). To maintain the policy, the backup module 118 may check for any older data objects 124 corresponding to old recovery points that are no longer supported under the policy as new backup data objects 124 are processed and uploaded to the cloud storage service 106.

Since not every data extent changes leading up to each backup time, each recovery point may include a mix of updated data objects created at the current time, such as at first time 306 or $n^{th}$ time 308 in the example of FIG. 3, as well as older data objects from prior times, including from initial time 304 as well as first time 306 (when at $n^{th}$ time 308).

Using FIG. 3 for a simple example where two recovery points are supported according to a policy decision, at $n^{th}$ time 308 the backup module 118 assesses the recovery point data objects associated with prior times 304 and 306 to determine whether either fall outside of the policy. Where two recovery points are supported, at $n^{th}$ time 308 the recovery point associated with initial time 304 is no longer be supported, and therefore the data objects listed for initial time 304 is marked for deletion. Prior to deletion, however, the backup module 118 checks to determine whether any of the data objects listed with initial time 304 are still necessary for supported recovery points. This occurs, for example, where individual data objects were not updated every time, if at all. For example, data object A/03800/t0 was not updated at any of the times 304, 306, or 308. Thus, even though it is listed in the metadata recovery object associated with initial time 304 that is no longer supported generally, data object A/03800/t0 may not be deleted because it is still necessary for the two recovery points that are still supported, at t1 and tn. As a further example, data object A/01800/tn was first updated at $n^{th}$ time 308. As a result, since the policy in this example is for two recovery points, A/01800/t0 may not be deleted because it is still necessary under the policy as a valid recovery point for the immediately prior recovery point t1 at first time 306. A dependency map may be maintained to facilitate checking whether a data object marked for deletion is still associated with a supported recovery point.

It is worth noting that, in embodiments of the present disclosure where the suffix is a timestamp, the suffix numbering does not reflect the number of supported recovery points, but rather the time at which the particular recovery point occurred. Thus, in the above simple example where only two recovery points are supported, there may be a scenario where for a given data object new recovery points occurred at times t1, t3, and t5. In such an example, the backup module 118 identifies the two most recent recovery points to be at t3 and t5. As such, the backup module 118 marks the data object at time t1 for deletion. This example is for illustration only.

Figure 4:
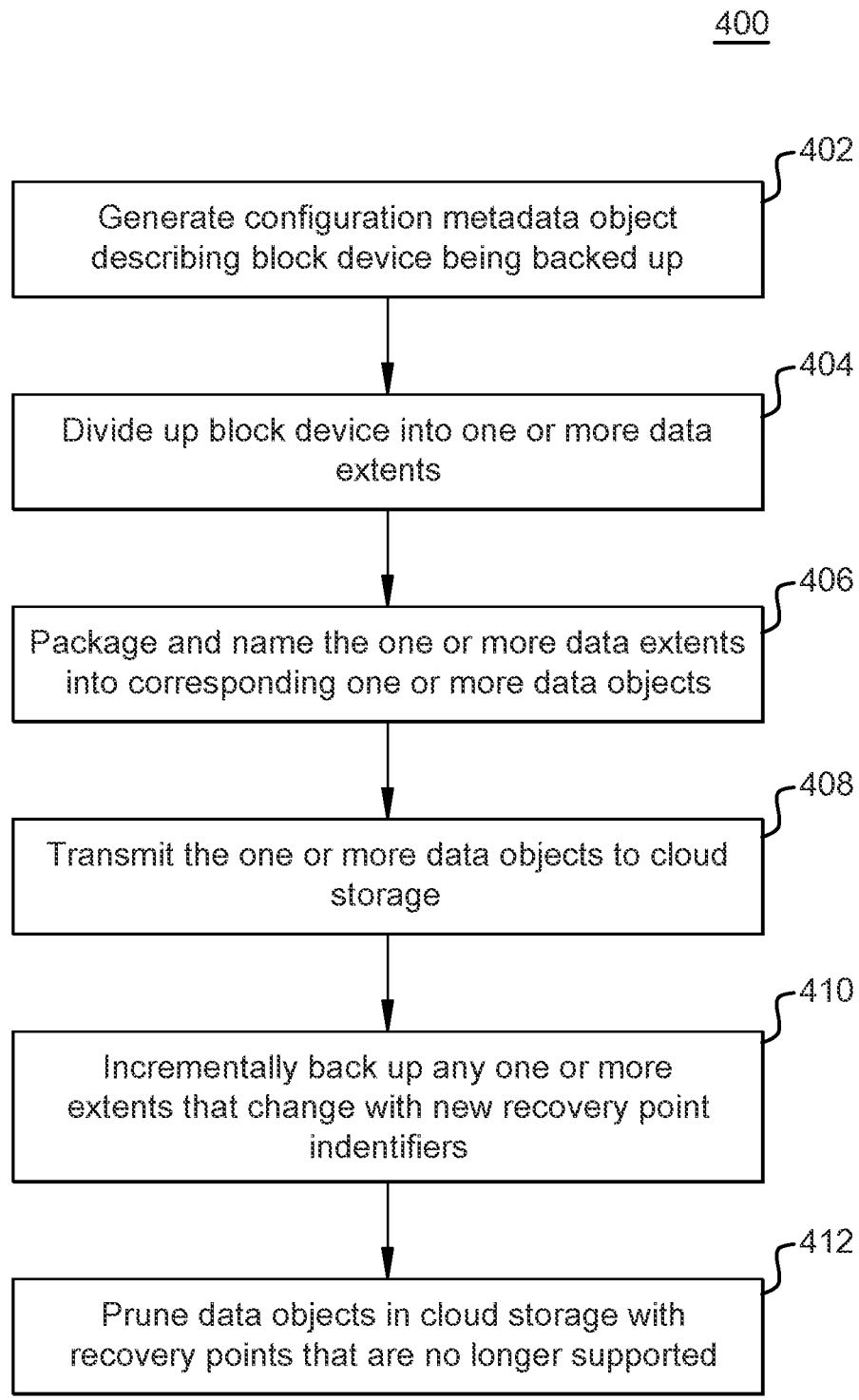
FIG. 4 is a flow diagram of a method of backing up a block storage device to an object storage service according to aspects of the present disclosure.

Turning now to FIG. 4, a flow diagram is illustrated of a method 400 of backing up a block storage device, such as storage device 116 of storage system 102 of FIG. 2, to an object storage service such as cloud storage service 106 according to aspects of the present disclosure. It is understood that additional steps can be provided before, during, and after the steps of method 400, and that some of the steps described can be replaced or eliminated for other embodiments of the method.

At step 402, the backup module 118 may generate the configuration metadata object that describes the block device being backed up, as described above with respect to FIG. 2. This may include such attributes as storage system name, volume name, capacity of the block device or volume, and block size of the block device, among other things.

At step 404, the backup module 118 may divide up the storage device 116 into one or more data extents, for example fixed-size data extents, where each data extent has a starting LBA that identifies the data extents within the address space of the given volume of the storage device 116.

At step 406, the backup module 118 packages and names the one or more data extents into corresponding one or more data objects, for example data objects 124a-124m of FIG. 2. At this step or at step 408, the backup module 118 may also generate a recovery point metadata object that identifies all of the data objects associated with the current recovery point. The names given to each data extent represents the LBA of the given data extent, and includes a recovery point identifier, for example as a suffix, that represents the recovery point that the data objects are associated with. In an embodiment, the backup module 118 may additionally hash the names for the data objects before transmission for storage at the cloud storage service 106 as an added security measure.

At step 408, the backup module 118 may transmit the one or more data objects, such as data objects 124a-124m, together with the configuration metadata object and the recovery point metadata object, to the cloud storage service 106.

At step 410, after a period of time has passed the backup module 118 may incrementally back up any one or more of the data extents at the storage device 116 that have been identified as having changed over the period of time. This may occur as described above with respect to FIG. 3, where the changed data extents are again packaged into data objects and given the same base name (and prefix, where applicable) with an updated recovery point identifier representing the new recovery point.

At step 412, which may occur simultaneously with or directly after step 410, the backup module 118 may prune the data objects with recovery point identifiers corresponding to old recovery points that are no longer supported by a policy that may have been set, for example as discussed above with respect to FIG. 3. This may include determining whether any data objects corresponding to unsupported recovery points are still necessary as associated with still-supported recovery points and removing those from candidacy for deletion.

In FIG. 4, the steps of incrementally backing up changed data extents and pruning data objects may repeat for as long as desired, which typically will continue over a long period of time as the cloud storage service 106 is maintained as a backup provider for the data on the storage system 102.

Figure 5:
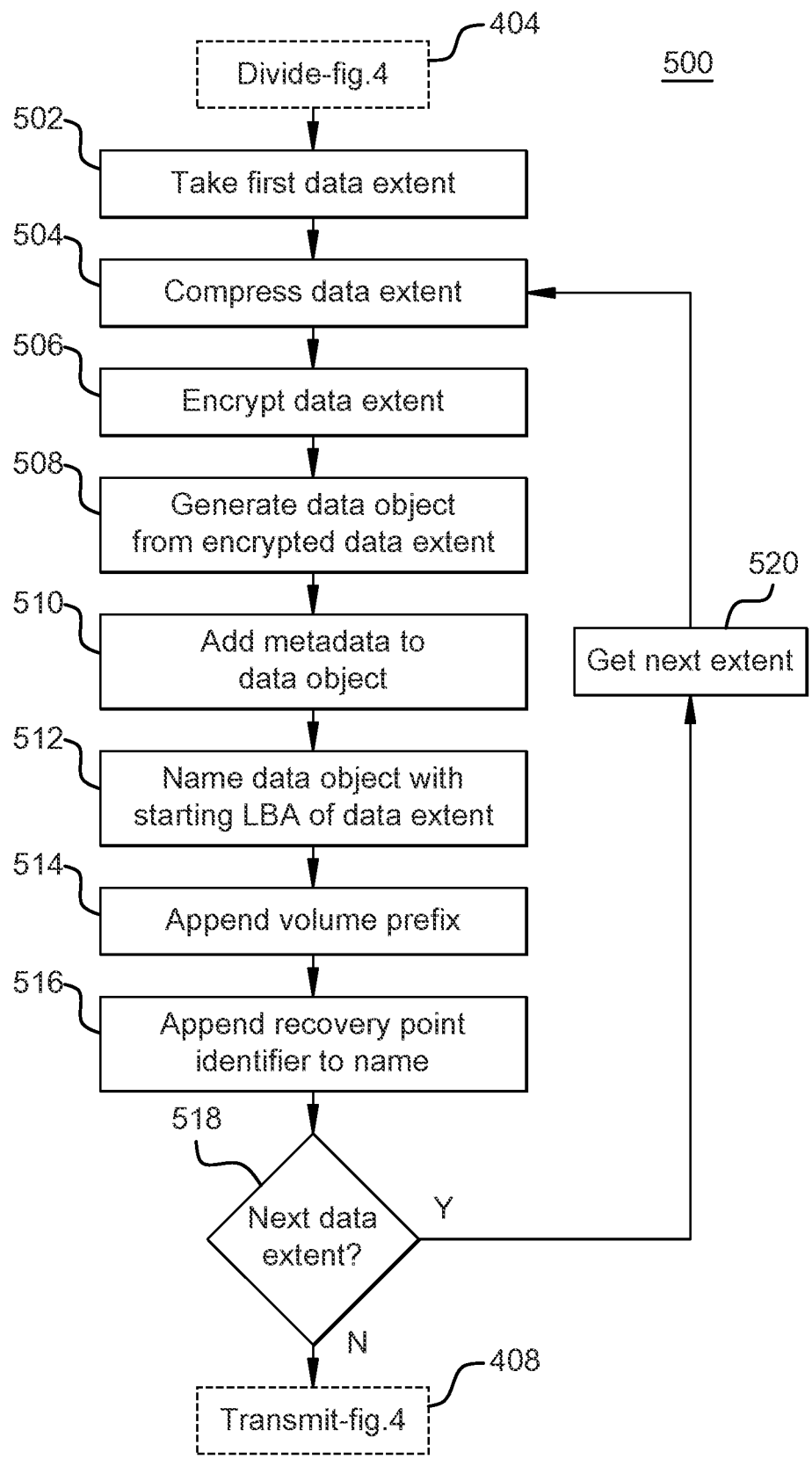
FIG. 5 is a flow diagram of a method of backing up a block storage device to an object storage service according to aspects of the present disclosure.

FIG. 5 is a flow diagram of a method 500 of backing up a block storage device, such as storage device 116 of storage system 102 of FIG. 2, to an object storage service such as cloud storage service 106 according to aspects of the present disclosure. For example, method 500 may be a specific example of step 406 of FIG. 400 above.

At step 502, after the storage device 116 has been divided into data extents at step 404 of FIG. 4, the backup module 118 takes the first data extent, for example shown as the uppermost left box in the extent matrix 122 of FIG. 2.

At step 504, the backup module 118 may compress the data extent taken at step 502. There are many different algorithms and tools useful for compressing data which may be used at step 504, as will be recognized by those skilled in the relevant art(s).

At step 506, the backup module 118 encrypts the data extent that was compressed at step 504. There are also many different algorithms and tools useful for encrypting data, including those that both compress and encrypt, which may be used.

At step 508, the backup module 118 generates a data object from the compressed and encrypted data extent.

At step 510, the backup module 118 adds metadata to the newly generated data object from step 508. This may additionally include generating a checksum of the newly generated data object and including that checksum, together with any information regarding the compression and encryption algorithms, in a metadata tag for the newly generated data object.

At step 512, the backup module 118 names the newly generated data object based on an address of the data extent such as the starting LBA.

At step 514, the backup module 118 appends the volume identifier to the base name given at step 512, separated from the base name by a delimiter. This volume identifier may be used to identify the volume that the data extent is associated with, for example where multiple volumes exist at the storage device 116, all of which are being backed up.

At step 516, the backup module 118 appends a recovery point identifier to the base name given at step 512, separated from the base name by a delimiter. This identifier represents the recovery point at which the data object was created. The identifier may be a value that can be sorted so that a later recovery point can be deterministically distinguished from an earlier recovery point, for example a time stamp.

With the data object named, the backup module 118 then determines whether there are any other data extents that have not yet been processed at decision step 518. If there are more data extents to process, the method 500 proceeds to step 520.

At step 520, the backup module 118 takes the next data extent and loops back to step 504 to process the next data extent as described above with respect to steps 504-516.

Returning to decision step 518, if there are no more data extents to process, the method 500 proceeds with transmitting the formed and named data objects to the cloud storage service 106, for example continuing with step 408 of FIG. 4. In an embodiment, the backup module 118 processes all of the data extents into data objects before transmitting the data objects (and configuration metadata objects, and recovery point metadata objects) to the cloud storage service 106 for backup. In an alternative embodiment, the backup module 118 causes the network interface 112 to transmit objects to the cloud storage service 106 on a rolling basis while data extents are still being processed into data objects.

Figure 6:
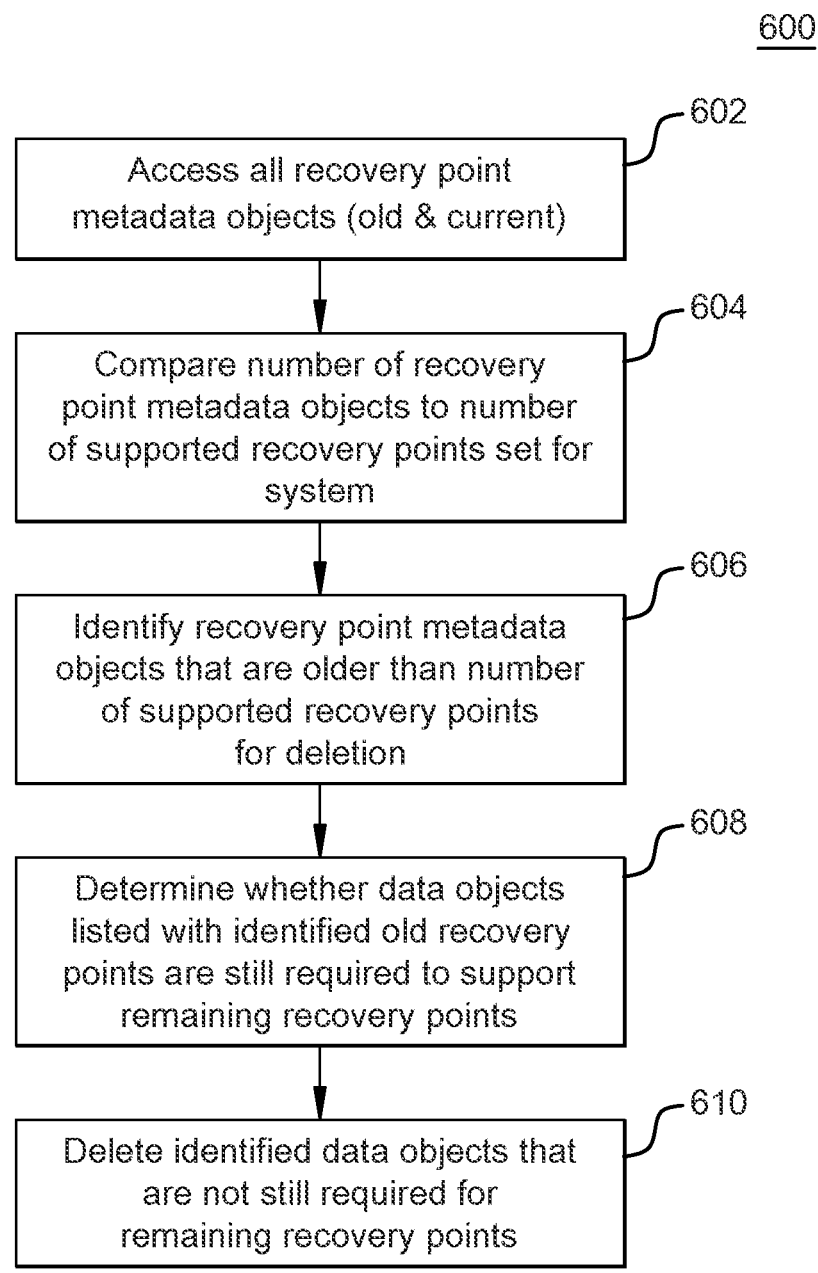
FIG. 6 is a flow diagram of a method of pruning objects stored with an object storage service according to aspects of the present disclosure.

FIG. 6 is a flow diagram of a method 600 of pruning data objects stored with an object storage service, such as cloud storage service 106, according to aspects of the present disclosure. For example, method 600 may be a specific example of step 412 of FIG. 4 above. As noted, pruning may occur simultaneously with or directly after an incremental backup of changed data extents.

At step 602, the backup module 118 may access all recovery point metadata objects stored at the cloud storage service 106, including the recovery point metadata object associated with the new incremental backup.

At step 604, the backup module 118 may compare the number of recovery point metadata objects to a number of supported recovery points that has been set according to a policy. As discussed above with respect to FIG. 3, this may be any number of points ranging from a few to several dozen or more.

At step 606, the backup module 118 may identify the recovery point metadata objects that are older than the number of supported recovery points. For example, where the policy supports two recovery points, and there are three recovery point metadata objects stored with the cloud storage service 106, the backup module 118 identifies the oldest recovery point metadata object as a candidate for deletion. Identifying a recovery point metadata object for deletion means that the list of data objects in that recovery point metadata object have been marked for deletion as corresponding to a recovery point outside the scope set by the policy.

At step 608, the backup module 118 may check each data object marked for deletion at step 606 to determine whether any correspond to recovery points that are still supported. This is useful because, since not every data extent changes leading up to each backup time, each recovery point may include a mix of updated data objects created at the current time as well as older data objects from prior times, as described in an example above with respect to FIG. 3. For those data objects that are still associated with a supported recovery point, the backup module 118 may remove them from the marked data objects for deletion.

At step 610, the backup module 118 instructs the cloud storage service 106 to delete all of the data objects that are still on the list for deletion, or in other words those data objects that are not associated with any supported recovery point.

The present embodiments can take the form of an entirely hardware embodiment, an entirely software embodiment, or an embodiment containing both hardware and software elements. In that regard, in some embodiments, the computing system is programmable and is programmed to execute processes including those associated with backing up a block storage device such as the processes of method 400 of FIG. 4. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides system, methods, and computer-readable media for backing up block storage devices to object storage service that has different protocols. In some embodiments, the method for backing up a block storage device to an object storage services includes identifying a data extent of an address space of a storage device. A data object is generated that encapsulates data of the data extent of the storage device and naming the data object with a base name representing a logical block address (LBA) of the data extent. The base name is appended with an identifier that deterministically identifies a recovery point that the data object is associated with, where the base name and the identifier comprise a data object name for the data object. The data object with the corresponding name is provided to the object storage service for backup of the data extent.

In further embodiments, the computing device includes a memory containing machine readable medium comprising machine executable code having stored thereon instructions for performing a method of backing up a storage device; and a processor coupled to the memory. The processor is configured to execute the machine executable code to: generate a data object that encapsulates a data extent comprising an address range of the storage device. The processor is also configured to name the data object with a base name representing a logical block address (LBA) of the data extent. The processor appends the base name with an identifier that deterministically identifies a recovery point that the data object is associated with, the base name and the identifier comprising a data object name for the data object. The processor is also configured to transmit the data object and the data object name to a cloud storage for backup of the data extent.

In yet further embodiments the non-transitory machine readable medium having stored thereon instructions for performing a method of backing up a storage device comprises machine executable code. When executed by at least one machine, the code causes the machine to: divide the storage device into a plurality of data extents; generate a plurality of initial data objects that encapsulate and correspond to the plurality of data extents; name each of the plurality of initial data objects with a base name representing a corresponding logical block address (LBA) of the respective data extent; append the base names with corresponding identifiers that deterministically identify an initial recovery point that the plurality of initial data objects are associated with, the base names combined with the identifiers making up data object names corresponding to the plurality of initial data objects; and transmit the plurality of initial data objects to a cloud storage for backup of the storage device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method executed by one or more processors, comprising:
   representing, by a storage server, a block-based storage device by a plurality of data extents, each data extent defined by a starting logical block address (LBA) within an address space of a storage volume used by the storage server to store data at the block-based storage device using a block storage protocol;
   converting, by the storage server, the plurality of data extents into a plurality of data objects, each data object corresponding to a data extent, configured to store data for the corresponding data extent;
   identifying, by the storage server, each data object with a base name that represents an LBA of the corresponding data extent, and an initial recovery point identifier indicating a time, t1 for an initial backup of the plurality of data objects;
   transmitting, by the storage server, the plurality of the data objects to a cloud-based storage system for executing the initial backup of the plurality of data objects using an object-based protocol;
   generating, by the storage server, an initial recovery point metadata object to identify the plurality of data objects in the initial backup executed by the cloud-based storage system at time t1;
   tracking, by the storage server, the plurality of data extents to identify any data extent whose data is modified at the block-based storage device, after the initial backup;
   updating, by the storage server, a name of each data object corresponding to the any data extent whose data is modified with a next recovery point identifier indicating a time for a next incremental backup executed by the cloud-based storage system;
   generating, by the storage server, an updated recovery point metadata object corresponding to each next incremental backup identifying each data object corresponding to the any data extent whose data is modified; and
   utilizing, by the storage server, the initial recovery point metadata object and updated recovery point metadata objects corresponding to next incremental backups for identifying a recovery point metadata object that is older than a number of recovery point metadata objects that can retained for the storage volume at any given time.

2. The method of claim 1, further comprising:
   maintaining, by the storage server, a first bit map for a first duration to track modification of data in certain data extents, after the initial backup; and
freezing, by the storage server, the first bit map after the first duration to take an incremental backup by the cloud-based storage system of data objects corresponding to the certain data extents with modified data.

3. The method of claim 2, further comprising:
   utilizing, by the storage server, a second bitmap to track modification of any data extent data, while the first bit map is frozen during the incremental backup.

4. The method of claim 1, wherein identifying a recovery point metadata object that is older than a number of recovery point metadata objects that can retained at any given time, comprises:
   comparing, by the storage server, a number of existing recovery point metadata objects to a supported number of recovery point metadata objects as defined by a policy; and identifying recovery point metadata objects older than the supported number with data objects as potential candidates for deletion.

5. The method of claim 4, further comprising:
deleting a data object from the potential candidates, when the data object is not required to support any remaining recovery point metadata object after the deletion.

6. The method of claim 1, further comprising:
utilizing, by the cloud-based storage system, a logical container assigned for the storage volume to store the initial backup and incremental backups.

7. The method of claim 6, further comprising:
transmitting, by the storage server, a configuration metadata object to the cloud-based storage system, the configuration metadata object identifying the block-based storage device, a system name and a block size used by the storage server to store data; wherein the configuration metadata object is stored by the cloud-based storage system at the logical container with the initial backup and incremental backups.

8. A non-transitory machine-readable storage medium having stored thereon instructions for performing a method, comprising machine executable code which when executed by at least one machine, causes the machine to:
   represent a block-based storage device by a plurality of data extents, each data extent defined by a starting logical block address (LBA) within an address space of a storage volume used by a storage server to store data at the block-based storage device using a block storage protocol;

convert the plurality of data extents into a plurality of data objects, each data object corresponding to a data extent, configured to store data for the corresponding data extent;

identify each data object with a base name that represents an LBA of the corresponding data extent, and an initial recovery point identifier indicating a time, t1 for an initial backup of the plurality of data objects;

transmit the plurality of the data objects to a cloud-based storage system for executing the initial backup of the plurality of data objects using an object-based protocol;

generate an initial recovery point metadata object to identify the plurality of data objects in the initial backup executed by the cloud-based storage system at time t1;

identify any data extent whose data is modified at the block-based storage device, after the initial backup;

update a name of each data object corresponding to the any data extent whose data is modified with a next recovery point identifier indicating a time for a next incremental backup executed by the cloud-based storage system;

generate an updated recovery point metadata object corresponding to each next incremental backup identifying each data object corresponding to the any data extent whose data is modified; and identify a recovery point metadata object that is older than a number of recovery point metadata objects that can retained for the storage volume at any given time.

9. The non-transitory machine-readable storage medium of claim 8, wherein the machine executable code which when executed by at least one machine, further causes the machine to:

utilize a first bit map for a first duration to track modification of data in certain data extents, after the initial backup; and freeze the first bit map after the first duration to take an incremental backup by the cloud-based storage system of data objects corresponding to the certain data extents with modified data.

10. The non-transitory machine-readable storage medium of claim 9, wherein the machine executable code which when executed by at least one machine, further causes the machine to:

utilize a second bitmap to track modification of any data extent data, while the first bit map is frozen during the incremental backup.

11. The non-transitory machine-readable storage medium of claim 8, wherein identifying a recovery point metadata object that is older than a number of recovery point metadata objects that can retained at any given time, comprises:

compare a number of existing recovery point metadata objects to a supported number of recovery point metadata objects as defined by a policy; and identify recovery point metadata objects older than the supported number with data objects as potential candidates for deletion.

12. The non-transitory machine-readable storage medium of claim 11, wherein the machine executable code which when executed by at least one machine, further causes the machine to:

delete a data object from the potential candidates, when the data object is not required to support any remaining recovery point metadata object after the deletion.

13. The non-transitory machine-readable storage medium of claim 8, wherein the machine executable code which when executed by at least one machine, further causes the machine to:

utilize a logical container assigned for the storage volume to store the initial backup and incremental backups.

14. The non-transitory machine-readable storage medium of claim 13, wherein the machine executable code which when executed by at least one machine, further causes the machine to:

transmit a configuration metadata object to the cloud-based storage system, the configuration metadata object identifying the block-based storage device, a system name and a block size used by the storage server to store data; wherein the configuration metadata object is stored by the cloud-based storage system at the logical container with the initial backup and incremental backups.

15. A system, comprising:

a memory containing machine readable medium comprising machine executable code having stored thereon instructions; and a processor coupled to the memory to execute the machine executable code to:

represent a block-based storage device by a plurality of data extents, each data extent defined by a starting logical block address (LBA) within an address space of a storage volume used by a storage server to store data at the block-based storage device using a block storage protocol;

convert the plurality of data extents into a plurality of data objects, each data object corresponding to a data extent, configured to store data for the corresponding data extent;

identify each data object with a base name that represents an LBA of the corresponding data extent, and an initial recovery point identifier indicating a time, t1 for an initial backup of the plurality of data objects;

transmit the plurality of the data objects to a cloud-based storage system for executing the initial backup of the plurality of data objects using an object-based protocol;

generate an initial recovery point metadata object to identify the plurality of data objects in the initial backup executed by the cloud-based storage system at time t1;

identify any data extent whose data is modified at the block-based storage device, after the initial backup;

update a name of each data object corresponding to the any data extent whose data is modified with a next recovery point identifier indicating a time for a next incremental backup executed by the cloud-based storage system;

generate an updated recovery point metadata object corresponding to each next incremental backup identifying each data object corresponding to the any data extent whose data is modified; and identify a recovery point metadata object that is older than a number of recovery point metadata objects that can retained for the storage volume at any given time.

16. The system of claim 15, wherein the machine executable code further causes to:

utilize a first bit map for a first duration to track modification of data in certain data extents, after the initial backup; and freeze the first bit map after the first duration to take an incremental backup by the cloud-based storage system of data objects corresponding to the certain data extents with modified data.

17. The system of claim 16, wherein the machine executable code further causes to:
utilize a second bitmap to track modification of any data extent data, while the first bit map is frozen during the incremental backup.

18. The system of claim 15, wherein identifying a recovery point metadata object that is older than a number of recovery point metadata objects that can retained at any given time, comprises:
compare a number of existing recovery point metadata objects to a supported number of recovery point metadata objects as defined by a policy; and
identify recovery point metadata objects older than the supported number with data objects as potential candidates for deletion.

19. The system of claim 18, wherein the machine executable code which when executed by at least one machine, further causes the machine to:
delete a data object from the potential candidates, when the data object is not required to support any remaining recovery point metadata object after the deletion.

20. The system of claim 16, wherein the machine executable code which when executed by at least one machine, further causes the machine to:
utilize a logical container assigned for the storage volume to store the initial backup and incremental backups; and
transmit a configuration metadata object to the cloud-based storage system, the configuration metadata object identifying the block-based storage device, a system name and a block size used by the storage server to store data; wherein the configuration metadata object is stored by the cloud-based storage system at the logical container with the initial backup and incremental backups.

* * * * *